United States Patent [19]

Chern et al.

[11] Patent Number: 4,764,953

[45] Date of Patent: Aug. 16, 1988

[54] METHOD AND APPARATUS FOR REMOTE DOORBELL ANSWERING

[76] Inventors: Lih-Ju Chern, 5403 SW. 149th Pl., Miami, Fla. 33185; Angela W. Kao; Ming-Luh Kao, both of 10545 SW. 129th Ct., Miami, Fla. 33186

[21] Appl. No.: 53,085

[22] Filed: May 22, 1987

[51] Int. Cl.$^4$ .............................................. H04M 1/26
[52] U.S. Cl. .................................. 379/355; 379/388; 379/103
[58] Field of Search ............... 379/40, 51, 52, 103, 379/167, 355, 388

[56] References Cited

U.S. PATENT DOCUMENTS

| | | |
|---|---|---|
| 3,740,737 | 6/1973 | Carleson . |
| 3,917,911 | 11/1975 | Lesher .................. 379/103 |
| 4,113,986 | 9/1978 | Clement et al. .......... 379/103 |
| 4,243,973 | 1/1981 | Sandidge . |
| 4,338,493 | 7/1982 | Stenhuis et al. .......... 379/103 X |
| 4,365,238 | 12/1982 | Kollin . |
| 4,370,675 | 1/1983 | Cohn . |
| 4,436,958 | 3/1984 | Hansen et al. .......... 379/103 |
| 4,459,434 | 7/1984 | Benning et al. . |
| 4,523,193 | 6/1985 | Levinson et al. . |

FOREIGN PATENT DOCUMENTS 2015850 9/1979 United Kingdom ............... 379/104

OTHER PUBLICATIONS

Forrest et al., "Improvements to the Enterphone Apartment Inter-Com System", *GTE Automatic Electric Technical Journal,* vol. 13, No. 3, Jul. 1972, pp. 102–105.

*Primary Examiner*—Keith E. George
*Attorney, Agent, or Firm*—Jerry A. Miller

[57] ABSTRACT

An apparatus for providing remote answering of a doorbell includes a circuit for receiving a doorbell signal indicative that a doorbell switch has been actuated. An autodialing circuit is coupled to and responsive to the receiving circuit and a telephone line for dialing a telephone number responsive to the doorbell signal. An alerting circuit generates an alert signal to be transmitted over the telephone line to the telephone number dialed by the autodialing circuit, so that the alert signal may alert a party answering the remote telephone to the fact that the party is responding to a doorbell rather than a normal telephone call. An audio speaker is physically situated near the doorbell switch, for reproducing audio signals from the telephone line which are generated at the remote telephone. An audio microphone is also physically situated near the doorbell switch, for generating electrical signals responsive to sounds made near the doorbell switch and transmitting the signals to the telephone line to the remote telephone. The apparatus further includes a switching network for coupling the door speaker and microphone to a local telephone set and a remote telephone set selectively in any combination.

18 Claims, 3 Drawing Sheets

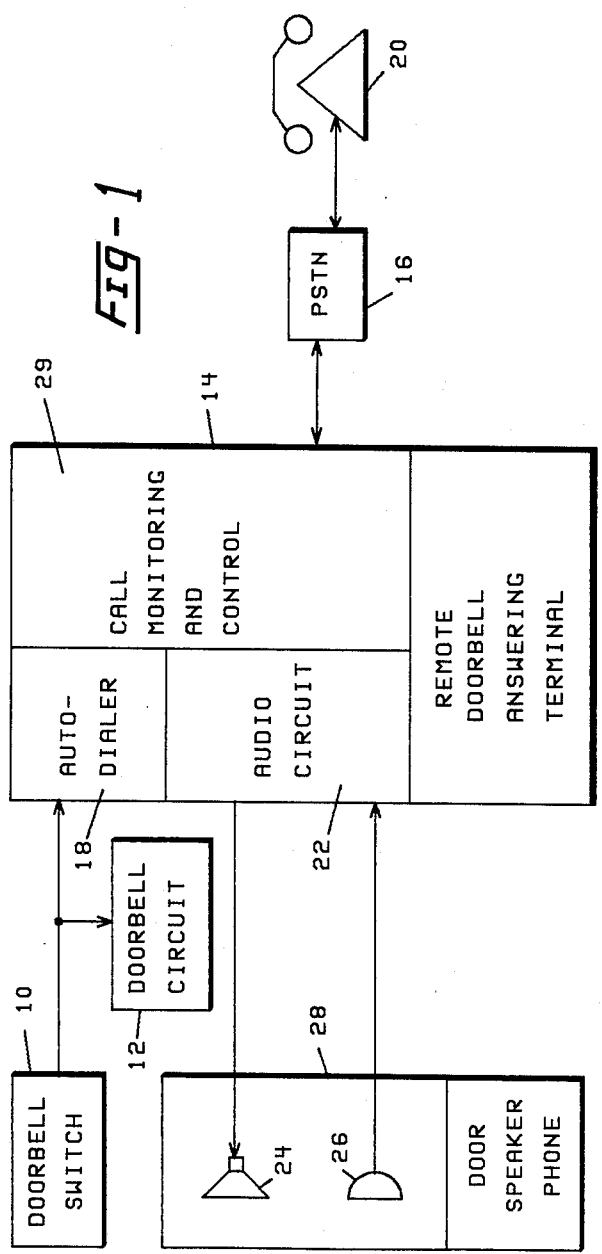

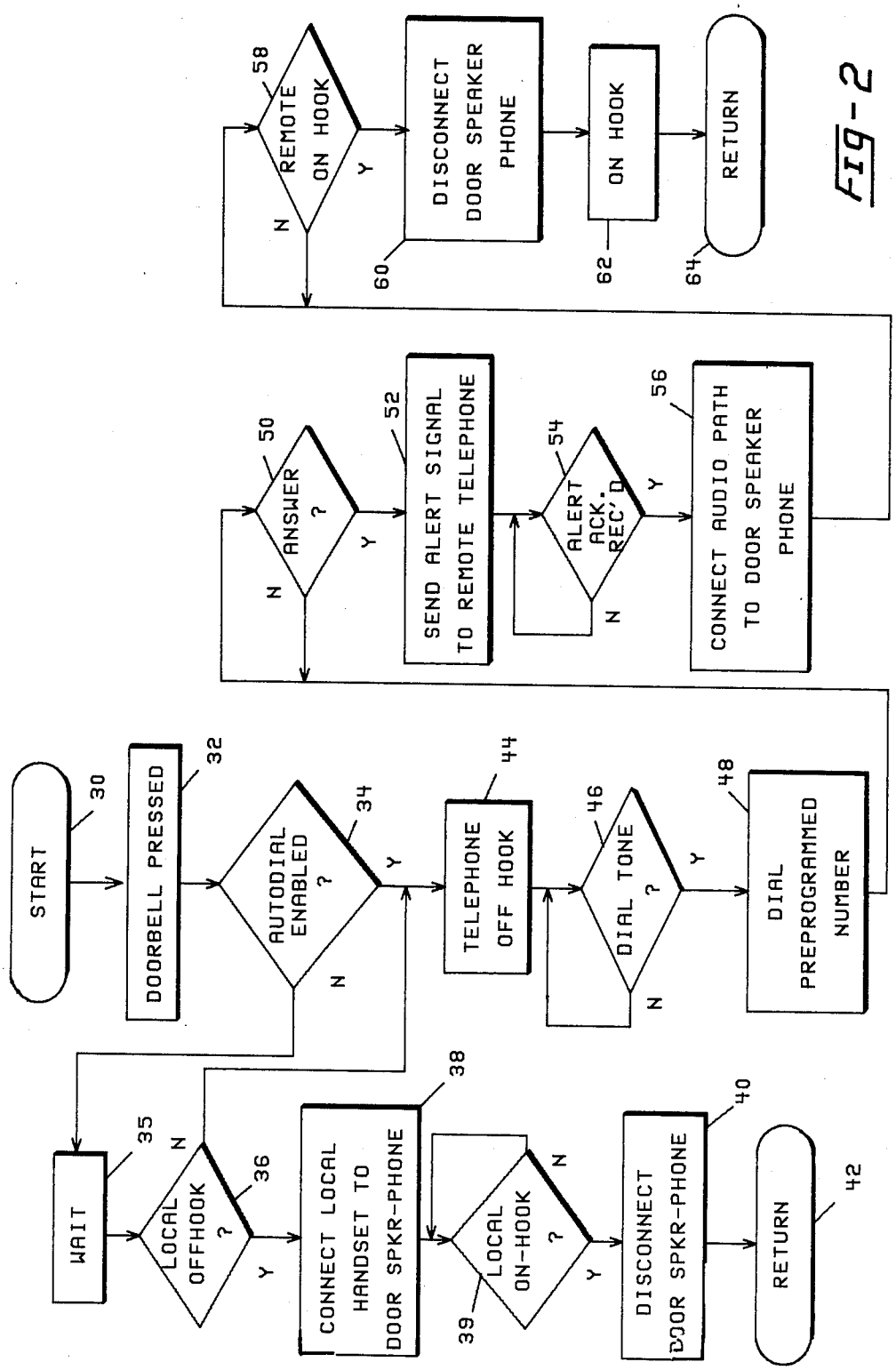

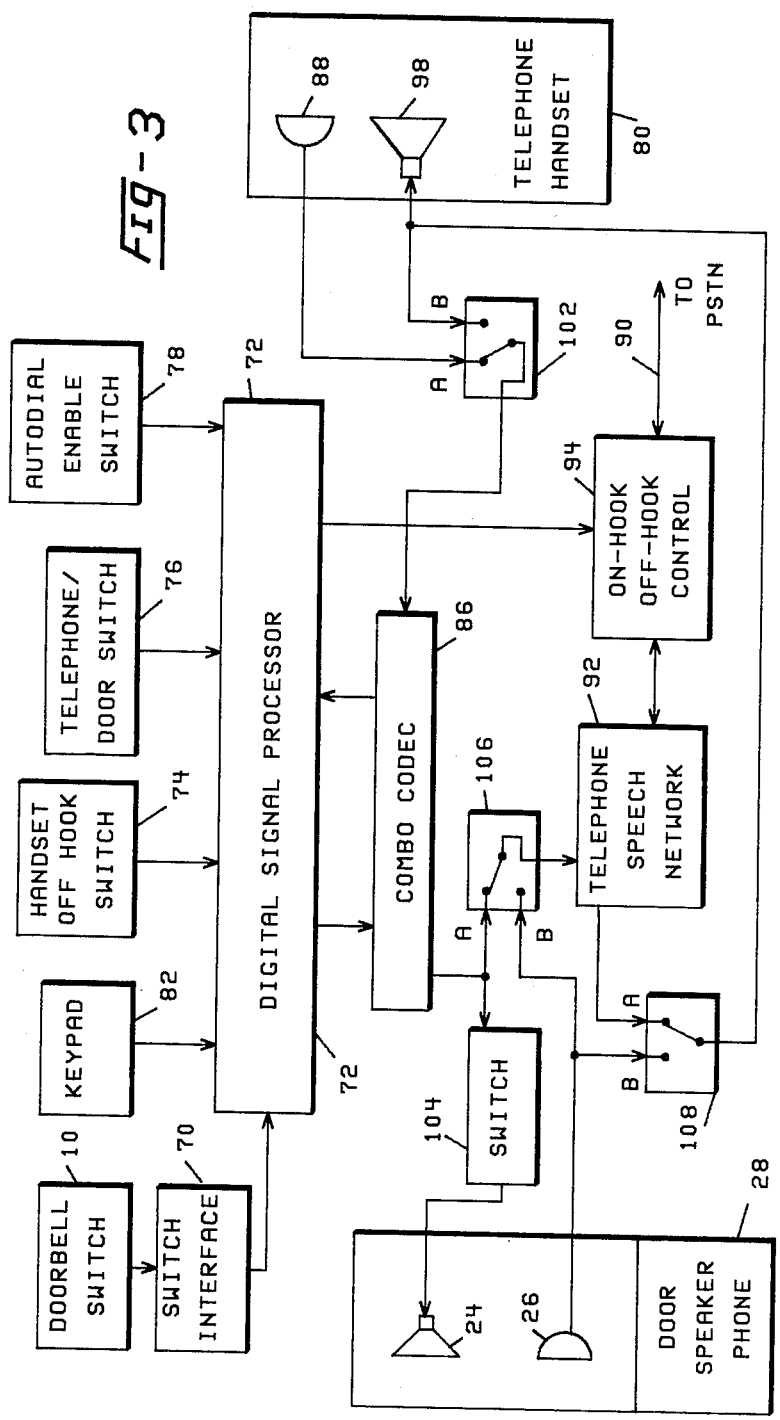

METHOD AND APPARATUS FOR REMOTE DOORBELL ANSWERING

BACKGROUND OF THE INVENTION

1. FIELD OF THE INVENTION

This invention relates generally to a device which allows the user to answer a doorbell from a remote location. More particularly, this invention relates to a method and apparatus for utilizing a telephone for response to a doorbell and a system integrating an intercom located near a doorbell switch into the telephone system.

2. BACKGROUND

The present invention addresses several problems. Consider first, by way of example, a scenario wherein a two worker household leaves their residence unattended during a large percentage of the day. Such households often experience difficulties in receiving deliveries from mail carriers and couriers. They also leave their belongings unguarded for long periods of time making them vulnerable to burglars. The present invention allows for receipt of such deliveries and provides an additional measure of protection against intruders in the form of a deterrent. Intruders who would attempt to break into a residence often will ring the doorbell as a check to see if anyone is home before attempting to gain illegal entry. If no reply to the doorbell is received, the intruder is able to determine that no one is home and may proceed with a crime with a high likelihood of success. The present invention may make this scenario less likely.

Consider also a family with children in school who arrive at home before parents. If a child forgets to take his or her key to school, he or she might be stranded outside the home in possibly inclement weather or other danger without any way to contact family or friends for help. This is especially the case in rural areas where nearby neighbors may be out of walking distance. The present invention can also be used to provide a solution for this problem.

The present invention is also useful in allowing a neighbor to more closely monitor a house while a family is away on vacation. Also, the present invention allows the elderly and handicapped to more readily respond to a doorbell.

In addition, the present invention allows ease of verification of the authenticity of delivery and repair persons and the like. For example, often intruders will disguise themselves as delivery or repair persons to gain simplified access to a property. For example, a person dressed as a service man might wish to gain access to a back yard to secure less obvious entry to a house. The present invention, by integration of the telephone system with a mechanism for responding to a doorbell, makes it simple to verify that a service person has been dispatched to the area. This verification can be carried out prior to allowing the access and without the knowledge of the perpetrator.

After consideration of the present invention, those skilled in the art will recognize many similar scenarios which lend themselves to use of the present invention.

It is known in the field of security systems to provide for an automatic dialing system which automatically calls to alert a police department, security company or owner by telephone if a break-in has occurred. However, such systems are only marginally useful in deterring a break-in by virtue of a deterrent effect. Such systems are not able to perform such tasks as respond to delivery persons and the like.

It is also known to provide for remote answering of a telephone by use of telephone answering machines which include a taper recorder with prerecorded message which is given to a caller. The caller may then leave a message if he or she desires which can be played back later to avoid missing telephone calls. Telephone companies and PBX manufacturers also provide call forwarding service so that the user's telephone calls will be automatically forwarded to another location if no one is present to answer a call personally. These devices also fall short of providing the functionality of the present invention.

U.S. Pat. No. 3,740,737 to Carleson relates to a home security system which provides a simulation of a barking dog which may be actuated by a doorbell. U.S. Pat. No. 4,243,973 to Sandidge provides an integrated home signal system which automatically reduces the volume of televisions and the like in response to a doorbell, or telephone and rings a chime associated with the doorbell and telephone. U.S. Pat. No. 4,365,238 to Kollin uses a sensing device to detect the sound that a telephone or doorbell produces and generates a light signal to assist the hearing impaired. U.S. Pat. No. 4,370,675 to Cohn describes a doorbell actuated television security system which turns on a television and intercom system responsive to ringing of a doorbell. U.S. Pat. No. 4,523,193 to Levinson et al. relates to a remote controlled doorbell in which actuation of the doorbell switch causes a radio transmitter to transmit a signal to a remote radio receiver to alert a person to the fact that the doorbell switch has been actuated.

The present invention provides features and versatility which are not contemplated by the above devices as will be appreciated after consideration of the following description taken in conjunction with the accompanying drawings.

SUMMARY OF THE INVENTION

Accordingly, it is an object of the present invention to provide an apparatus and method for providing versatile remote answering of a doorbell.

It is another object of the present invention to provide a device for remote doorbell answer which uses a programmable autodialer responsive to the actuation of a doorbell switch.

It is another object of the present invention to provide an integrated communication network comprising a local telephone coupled via the public telephone network to a remote telephone and an intercom box situated adjacent a doorbell switch.

It is another object of the present invention to provide a method and apparatus for allowing a user to have a two way conversation with a visitor remotely to deceive the visitor into believing that someone is home.

It is an advantage of the present invention that the doorbell may be programmable to be answered by a neighbor or anyone else via the public switched telephone network to provide a heretofore unachieved ability to remotely answer a doorbell.

It is an advantage of the present invention to provide a switchable environment where any two or more users at a local telephone, remote telephone and doorbell may engage in conversation with the local telephone user having the ability to provide switching between the other parties as desired.

It is another advantage of the present invention that implementation may utilize existing doorbell wiring as well as the existing telephone network.

It is a further object and advantage of the present invention to provide a versatile method and apparatus for remote doorbell answering which provides security and convenience to the user.

In one embodiment of the present invention an apparatus for providing remote answering of a doorbell includes a circuit for receiving a doorbell signal indicative that a doorbell switch has been actuated. An autodialing circuit is coupled to and responsive to the receiving circuit and a telephone line for dialing a telephone number responsive to the doorbell signal.

In another embodiment of the present invention an apparatus for providing remote answering of a doorbell includes a circuit for receiving a doorbell signal indicative that a doorbell switch has been actuated. An autodialing circuit is coupled to and responsive to the receiving circuit and a telephone line for dialing a telephone number responsive to the doorbell signal. An alerting circuit generates an alert signal to be transmitted over the telephone line to the telephone number dialed by the autodialing circuit, so that the alert signal may alert a party answering a telephone at the telephone number to the fact that the party is responding to a doorbell rather than a normal telephone call. An audio speaker is physically situated near the doorbell switch, for reproducing audio signals from the telephone line which are generated at the remote telephone. An audio microphone is also physically situated near the doorbell switch, for generating electrical signals responsive to sounds and transmitting the signals to the telephone line.

A method, according to one embodiment of the present invention, of answering a doorbell having a doorbell switch, includes the steps of detecting that the doorbell switch has been actuated, and connecting a speaker phone situated near the doorbell switch to a telephone circuit so that a response to the doorbell switch actuation may be made by voice communication over the telephone network.

In another embodiment of the present invention, an apparatus for responding to actuation of a doorbell switch includes a speaker phone situated near the doorbell switch and a local telephone handset and means for accessing a public telephone network. A switching network connects any two or more of these devices together to complete a path suitable for voice communication.

The invention may be implemented as a portion of an autodial telephone or may otherwise be implemented in the form of a device which may be connected to an existing telephone and doorbell system without radical modification.

These and other objects, features, and advantages of the invention will become apparent to those skilled in the art upon consideration of the following detailed description taken in conjunction with the accompanying drawings.

BRIEF DESCRIPTION OF THE DRAWINGS

FIG. 1 is an illustrative block diagram showing the operation of the present invention.

FIG. 2 is a flow chart of the process of the present invention.

FIG. 3 is a more detailed schematic of the present invention.

DETAILED DESCRIPTION OF THE INVENTION

Turning now to the drawings wherein like reference numerals designate identical or corresponding parts throughout the several views, and more particularly to FIG. 1 thereof, there is shown an illustrative block diagram of the present invention which illustrates the basic function of the present invention. In FIG. 1, a doorbell switch 10 which is conventionally mounted adjacent a door may be coupled to a conventional doorbell circuit 12 for actuating a doorbell. The doorbell switch 10 is also coupled to a doorbell answering terminal 14 of the present invention. Doorbell answering terminal 14 is in turn coupled to the Public Switched Telephone Network (PSTN) 16 just as though it were an ordinary telephone. In addition to the features to be described, the doorbell answering terminal 14 may also include facilities for local answering of the doorbell using a telephone handset as a transducer as well as the normal functionality of an ordinary telephone. Some of the specific structure required for this function has been omitted from FIG. 1 for ease of explanation.

The remote doorbell answering terminal 14 includes an automatic dialing device (autodialer) 18 which is responsive to the actuation of the doorbell switch 10 to automatically dial a predetermined telephone number stored in a memory thereof. The telephone number dialed by the autodialer 18 causes the PSTN 16 to connect the remote doorbell answering terminal to a telephone 20 associated with the predetermined telephone number. When the remote telephone is answered, an audio circuit 22 of the remote doorbell answering terminal couples the audio path of the telephone 20 to a loudspeaker 24 and a microphone 26 situated adjacent the door. Loudspeaker 24 and microphone 26 may be part of an existing intercom system in one embodiment of the invention, but this is not to be limiting. The combination of loudspeaker 24 and microphone 26 are referred to collectively herein as a door speaker phone 28. The technology used to provide the function of the door speaker phone 28 may be similar to the technology used in conventional office speaker phones. A call monitoring and control portion 29 of terminal 14 monitors the call and controls the process as will become clear shortly.

Numerous variations and enhancements of the present invention are possible. For example, it is possible to provide an electronic lock on the door which may be remotely or locally unlocked or locked by entering an appropriate code on a touch tone telephone. This code can be entered after a telephone link is established. The code is entered by the remote keypad and is decoded by a digital signal processor which then either locks or unlocks the door as required by sending an appropriate signal to an electronic lock. It is also to be noted that the present invention, although described in conjunction with the PSTN, is not limited to use over conventional analog telephone lines, but is equally well adapted to digital telephone systems and the like.

Turning now to FIG. 2, a flow chart of the operation of the present invention is shown. The process begins at 30 and the doorbell is pressed or actuated at 32. When the doorbell switch is actuated at 32, the terminal checks to see if the autodial feature is enabled at 34. If not, the process waits at 35 for a predetermined time period, for example one minute. The local off hook signal is continuously monitored and if an off hook signal at a local telephone at 36 has not occurred by this time, control passes to 44. If the local telephone is taken off hook at 36, control passes to 38 where the local handset is connected to the door speaker phone to enable conversation between the local telephone and the person who rang the doorbell. The control then passes to 39 where an on hook is awaited at the local telephone. When the on hook is detected, the door speaker phone is disconnected at 40 and the process returns to 30 at 42.

If the autodial is enabled at 34 or no local off hook is detected at 36, control passes to 44 where the ringing of the doorbell causes the remote doorbell answering terminal 14 to produce a telephone off hook signal at 44. As previously mentioned, the terminal 14 may actually include a telephone in one embodiment. At step 46 the off hook terminal awaits a dial tone from the PSTN 16. When a dial tone is received at 46, the autodialer 18 dials the pre-programmed telephone number at 48.

When the remote telephone set 20 goes off hook, the answer is detected at step 50 where control is passed to 52. At step 52, the terminal 14 sends an alert signal to the remote telephone 20 to inform the answering party that the call it is taking is not an ordinary phone call, but rather is a call generated in response to actuation of a doorbell switch. This alert signal may be any suitable special signal such as an audible beep or the like which will serve the purpose of alerting the answering party to the nature of the call. This feature is in keeping with the security aspects of the present invention so that an appropriate answer may be given by the answering party which will not let on that no one is home. For example, if the number dialed is that of business, the answering party might be likely to answer the call with a special message such as the name of the business or the like (e.g. "Good morning, XYZ Plumbing Company"). Such a response would likely give away the fact that the call is being answered remotely. However, once the answering party is alerted to the nature of the call, an appropriate greeting may be given (e.g. "Hello, who is there?").

After the alert acknowledge signal is received back by the terminal 14 at 54, the audio path from the PSTN is coupled to the door speaker phone 28. By making the connection only after the alert acknowledge signal has been detected by the doorbell answering terminal, an inappropriate greeting may still be corrected. At step 58, the terminal 14 awaits a remote on hook signalling the end of connection.

When the remote telephone goes on hook at 58, the audio path is disconnected from the door speaker phone 28 at 60. The terminal 14 then goes on hook at 62 and the process ends at 64. Any time during the entire process of FIG. 2 that the local handset is taken off hook, control immediately transfers to step 38. Those skilled in the art will recognize that several of the steps may be interchanged in time, for example 60 and 62, without departing from the present invention.

Those skilled in the art will also appreciate that the flow chart of FIG. 2 is simplified for clarity in that the loops at 39, 46, 50, 54 and 58 could potentially result in infinite loops if implemented strictly as shown. In a preferred implementation, an appropriate timer should be activated in these loops, the system will reset itself and then control passed back to 30 if the appropriate response is not obtained in a reasonable time. Such use of time out timers is well known in the art and their omission is believed to simplify the description of the invention.

Also in a preferred implementation, to be described more fully in conjunction with FIG. 3 to follow, the terminal is based upon a digital signal processor which determines the various line conditions at 46, 50, 54 and 58 by analyzing the line. The signals generated at 48 and 52 are similarly generated by the digital signal processor.

Turning now to FIG. 3, a more detailed schematic view of a preferred embodiment of the present invention is shown. In some embodiments, a switch interface 70 may be needed to adapt to the wide variety of doorbells which are commercially available. This interface may include an AC to DC converter, switch debouncer and other common circuitry as would be required to adapt the doorbell switch for use with the present terminal. In the simplest embodiments, the doorbell switch 10 operates a DC circuit and is readily adaptable to providing a simple logic level change to a digital signal processor 72. In other embodiments, the actual sound of the doorbell may be detected.

In the preferred embodiment, digital signal processor 72 is a programmed process such as the Texas Instruments TMS320C17 which is a general purpose signal processing microcomputer with 4K words of Read Only Memory (ROM) and 256 words of Random Access Memory (RAM). If required, additional external RAM or ROM may be added. Those skilled in the art will appreciate that other known microcomputers or equivalent analog or digital substitutes may be substituted without departing from the present invention.

The output of the switch interface 70 is applied to the digital signal processor 72 either at an interrupt line or an I/O line as desired for the exact implementation. The digital signal processor also receives input from external switches 74, 76, and 78 which are respectively handset Off hook switch, Telephone/Door switch and Autodial enable switch. The Off hook switch is the local telephone handset switch hook. The Telephone/Door switch is a user selectable switch which selects either the PSTN 90 or the door speaker phone 28 that the local telephone handset will access. This switch also affords the user the ability to switch back and forth as desired (for example in the situation where the user wishes to quickly verify the identity of the person at the door). The digital signal processor 72 also receives input from a local keypad 82 which in an alternative embodiment may take the place of the switches 76 and 78. Keypad 82 is used to dial out when the terminal 14 is in the telephone mode as selected by switch 76 and is also used an an input device for programming the digital signal processor 72 with the telephone number to be dialed. In one embodiment of the invention, the memory of the digital signal processor 72 stores a plurality of telephone numbers stored by the user in advance. The user may then select one of the numbers from the keypad for dialing using an abreviated code in a manner similar to standard speed calling.

The digital signal processor 72 is also coupled to a combo codec circuit 86 which is used for analog to digital conversion of the signals generated locally and received over the phone lines. The digital conversion is needed in the present embodiment so that the digital signal processor may operate digitally on the signals. Codec circuit 86 also converts the digital signals generated by the digital signal processor 72 to analog for transmission over phone line 90 to the remote telephone 20 or to speaker 24. In the present embodiment of the invention, the digital signal processor 72 is used to generate pulse or DTMF signals to effect the dialing and autodialing functions of the present invention. Digital signal processor 72 also performs the functions of detecting the dial tone, generating DTMF and alert signals, detecting remote off hook, detecting alert acknowledge, detecting remote on hook as well as any other necessary analysis of telephone line conditions to enable determinations of line conditions.

Codec circuit 86 may be any suitable commercially available codec such as the Texas Instruments TCM-2916 combo codec chip. Other manufacturers make similar products which are suitable substitutes.

Signals such as DTMF tones and other required signals generated by the digital signal processor are converted to analog by codec circuit 86 and transmitted out over the telephone line 90 via a telephone speech network 92. Network 92 may include gain control, hybrid networks, power regulation, surge protection and other known functions implemented to interface an electrical audio signal to a telephone network. Digital signal processor 72 also controls an on hook/off hook control switch 94 which takes the terminal on and off hook as desired. Codec circuit 86 also converts analog signals received over the phone lines (or locally generated) to digital for use by the digital signal processor 72.

Terminal 14 also includes a plurality of switches which operate under the control of the Digital Signal Processor 72 and are appropriately switched to control the audio path as required. Switch 102 couples the audio signals at microphone 88 of the local telephone handset 80 or the audio signals generated by the remote telephone 20 to the codec circuit 86 for digitizing. The digitized signal may be simply looped through the Digital Signal Processor 72 and converted back to analog by the codec circuit 86. The signal then passes through a switch 104 for use in answering the doorbell locally or remotely or to switch 106 for use in making normal telephone calls from the handset 80.

To place a call using the terminal as a conventional telephone set the switch 104 disconnects the audio from the loudspeaker 24 and routes the audio from 88 through a switch 106 to the telephone speech network 92. Audio from the PSTN is passed through switch 108 to the speaker 98 of the local handset 80.

When using the local handset to answer the doorbell, the switch 102 routes the microphone signal from 88 to codec circuit 86 (through Digital Signal Processor 72) and switch 104 is closed to complete the path in one direction. In the other direction, the switch 108 routes the signal from microphone 26 to speaker 98. It will be appreciated that various audio amplifiers and the like may be needed in certain paths which have not been shown but which will be evident to those of skill in the art.

When the doorbell is answered remotely by remote telephone 20, the audio from the remote phone 20 is delivered by the speech network 92 to switch 108, switch 102, codec 86 (through Digital Signal Processor 72) then to switch 104 and loudspeaker 24. The microphone 26 signal is passed through switch 106 to network 92 for delivery to the remote telephone 20. The telephone activity during remote answering of the doorbell switch 10 is monitored by the digital signal processor 14 at all times via the path of speech network 92 to switch 108 to switch 102 and codec circuit 86. The various switch positions of switch 102, switch 104, switch 106, and switch 108 are shown in Table 1 for various conditions of the system.

TABLE 1

|  | SW. 102 | SW. 104 | SW. 106 | SW. 108 |
|---|---|---|---|---|
| ALERT/ AUTODIAL | B | O | A | A |
| LOCAL PHONE CALL | A | O | A | A |
| LOCAL DOOR ANSWER | A | C | X | B |
| REMOTE DOOR ANSWER | B | C | B | A |

A = Position A.
B = Position B.
C = Closed position.
O = No connection.
X = Don't care The switching capability of the present invention, it will be noted, allows for communication between a remote telephone user, a local telephone user and a person ringing a doorbell in any combination. This allows the user to answer the doorbell from either a local or remote location without alerting the person at the door to the presence or absence of a person at the premises. Thus, a variety of security and convenience features may be implemented. Those skilled in the art will also appreciate that once the connection is made between the doorbell and the telephone, any of a plurality of telephone features is at the disposal of the user for a variety of specialized applications. For example, answering services, paging services, security services as well as standard telephone service options such as call waiting, call forwarding and other such features may be integrated within the system to achieve a variety of specialized functions.

It should be noted that the ability to answer the doorbell from a local telephone handset may have distinct advantages to the elderly or handicapped who may have difficulty getting up to answer the door. Since the local terminal 14 may be easily equipped with a wireless handset as is known in the art, the ability to remotely answer the doorbell is further enhanced. It will also be evident that the door intercom may be coupled to a remote handset by way of a radio frequency link or the like as opposed to a conventional telephone line. Further, it should be noted that the three way link made possible by the present invention is under the control of the terminal 14 and/or the user of the local handset and can be controlled in a variety of ways which can be used to the benefit of the owner. Numerous uses and benefits will occur to the user which substantially enhance his security and convenience.

Thus, it is apparent that in accordance with the present invention, a method and apparatus that fully satisfies the aims, advantages and objectives is set forth above. While the invention has been described in conjunction with specific embodiments, it is evident that many alterations, variations and modifications will become apparent to those skilled in the art in light of the foregoing description. Accordingly, it is intended that the present invention embrace all such alternatives, modifications and variations as fall within the spirit and broad scope of the appended claims.

What is claimed as new and desired to be secured by Letters Patent of the United States is:

1. A method of responding to actuation of a dwelling's doorbell switch in such a manner as to make it appear to the person actuating the switch that said doorbell switch actuation is being responded to by someone within said dwelling, the method comprising the steps of:

detecting actuation of said doorbell switch by said person;

reading a signal indicating whether or not someone within said dwelling has answered the doorbell within a predetermined period of time, said reading step including delaying for said predetermined period of time and then determining that a response to said doorbell switch has not occurred;

if said signal indicates that noone within said dwelling answered said doorbell within said predetermined period of time, audodialing a telephone number associated with a remote telephone located somewhere other than inside said dwelling; and establishing a communication connection between said remote telephone and an audio transducer situated adjacent said doorbell switch;

whereby, said person actuating said doorbell switch is put in communication with a second person at a remote telephone who can respond to actuation of the doorbell switch as if the second person were within said dwelling and responding through an intercom.

2. The method of claim 1, further comprising the step of reading an enable signal indicative of the position of a switch indicating that a remote answering system is enabled.

3. The method of claim 1, wherein said establishing step further comprises the steps of coupling a telephone audio circuit to a door intercom system upon receiving a response to dialing said telephone number.

4. The method of claim 3, further comprising the steps of detecting that said remote telephone at said telephone number has gone off hook and transmitting an alert signal to said remote telephone.

5. The method of claim 1, wherein said establishing step further includes the step of connecting a speaker phone situated near said doorbell switch to one of a public switched telephone circuit and a local telephone handset.

6. An apparatus for providing remote answering of a dwelling's doorbell, comprising in combination;

detecting means for detecting actuation of a doorbell switch;

means for waiting for a predetermined time period after detecting actuation of said doorbell switch;

means for determining if said doorbell switch actuation has been responded to within said predetermined time period;

dialing means for autodialing a predetermined telephone number associated with a remote telephone located somewhere other than inside said dwelling if said determining means indicates that said doorbell has not been responded to within said predetermined time period.

7. The apparatus of claim 6, further comprising an enable switch which can be manually actuated by a user to enable operation of said remote answering apparatus.

8. The apparatus of claim 6, further comprising:

alerting means for generating an alert signal to be transmitted over said telephone line to said remote telephone associated with said telephone number dialed by said dialing means, whereby said alert signal may alert a party answering a telephone at said telephone number to the fact that said party is responding to a doorbell rather than a normal telephone call.

9. The apparatus of claim 6, further comprising:

audio speaker means, physically situated near said doorbell switch, for reproducing audio signals from said telephone line which are generated at said telephone number dialed by said dialing means.

10. The apparatus of claim 6, further comprising:

audio microphone means, physically situated near said doorbell switch, for generating electrical signals responsive to sounds and transmitting said signals to said telephone line.

11. The apparatus of claim 6, further comprising:

memory means, accessible by said dialing means, for storing said telephone number to be called by said dialing means; and programming means, coupled to said memory, for storing a selected telephone number in said memory.

12. The apparatus of claim 11, wherein:

said memory means is capable of storing a plurality of possible telephone numbers to be dialed; and further comprising:

selecting means, coupled to said dialing means and said memory means, for selecting one of said plurality of possible telephone numbers for dialing by said dialing means.

13. The apparatus of claim 6, further comprising:

a local telephone handset coupled to said telephone line.

14. The apparatus of claim 6, further comprising:

alerting means for generating an alert signal to be transmitted over said telephone line to said remote telephone associated with the telephone number dialed by said dialing means, whereby said alert signal may alert a party answering a telephone at said telephone number to the fact that said party is responding to a doorbell rather than a normal telephone call;

audio speaker means, physically situated near said doorbell switch, for reproducing audio signals from said telephone line which are generated at said telephone number dialed by said dialing means; and audio microphone means, physically situated near said doorbell switch, for generating electrical signals responsive to sounds and transmitting said signals to said telephone line.

15. The apparatus of claim 6, wherein said dialing means includes a digital signal processor for generating DTMF signals.

16. The apparatus of claim 8, wherein said alerting means includes means for transmitting a distinguishable audio signal.

17. The apparatus of claim 6, further comprising:

a speaker situated near said doorbell switch;

a microphone situated near said doorbell switch, said speaker and said microphone being collectively referred to as a door speaker phone; and local telephone means, which may be selectively coupled to either said door speaker phone, for responding to actuation of said doorbell switch or coupled to said telephone line for conventional voice communication.

18. The apparatus of claim 17, further comprising switching means for switching audio signals so that voice communication may take place between any of the door speaker phone, the local telephone means and a remote telephone device in any combination.

* * * * *